United States Patent
Tsirkin et al.

(10) Patent No.: US 12,494,898 B2
(45) Date of Patent: Dec. 9, 2025

(54) SECURED PERIPHERAL DEVICE COMMUNICATION VIA BRIDGE DEVICE IN VIRTUALIZED COMPUTER SYSTEM

(71) Applicant: RED HAT, INC., Raleigh, NC (US)

(72) Inventors: Michael Tsirkin, Yokne'am Illit (IL); Amnon Ilan, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 586 days.

(21) Appl. No.: 17/900,845

(22) Filed: Aug. 31, 2022

(65) Prior Publication Data
US 2024/0072995 A1    Feb. 29, 2024

(51) Int. Cl.
*H04L 9/08* (2006.01)
*G06F 13/40* (2006.01)
*G06F 13/42* (2006.01)

(52) U.S. Cl.
CPC ........ *H04L 9/0819* (2013.01); *G06F 13/4027* (2013.01); *G06F 13/4221* (2013.01); *G06F 2213/0024* (2013.01); *G06F 2213/0026* (2013.01)

(58) Field of Classification Search
CPC ........ G06F 21/57; G06F 21/577; G06F 21/50; G06F 21/44; G06F 21/445; G06F 21/575; G06F 21/572; G06F 21/71; G06F 21/52; G06F 9/45558; G06F 2009/45579; G06F 2009/45583; G06F 13/4045; G06F 13/4031; G06F 13/4027; H04L 41/0806
See application file for complete search history.

(56) References Cited

U.S. PATENT DOCUMENTS

| | | |
|---|---|---|
| 5,610,715 A | 3/1997 | Yoshii et al. |
| 6,377,060 B1 | 4/2002 | Burkhart et al. |
| 8,023,528 B2 | 9/2011 | Hendel et al. |
| 8,954,897 B2 | 2/2015 | Neystadt et al. |
| 9,477,486 B2 | 10/2016 | Raj et al. |
| 9,672,052 B1 | 6/2017 | Berreth et al. |

(Continued)

FOREIGN PATENT DOCUMENTS

| | | |
|---|---|---|
| CN | 109858265 A | 6/2019 |
| CN | 109858265 B | 6/2019 |

OTHER PUBLICATIONS

Extended European Search Report of European Application No. 22214209.3 mailed Jul. 14, 2023, 10 pages.

(Continued)

*Primary Examiner* — Tae K Kim
(74) *Attorney, Agent, or Firm* — Womble Bond Dickinson (US) LLP

(57) ABSTRACT

Systems and methods for secured peripheral device communication via a bridge device in virtualized computer systems. An example method may comprise receiving, by a virtualized execution environment running on a computing system, a state measurement associated with a bridge device of the computing system; generating an ephemeral key; responsive to validating the state measurement, transmitting, to the bridge device, the ephemeral key encrypted using a device key associated with the bridge device; and transmitting, to the bridge device, an access request directed to a peripheral device accessible via the bridge device, wherein the access request is encrypted using a value derived from the ephemeral key.

20 Claims, 9 Drawing Sheets

(56) References Cited

U.S. PATENT DOCUMENTS

| | | |
|---|---|---|
| 9,678,895 B2 | 6/2017 | Scott-Nash |
| 9,906,493 B1 | 2/2018 | Rodgers et al. |
| 10,048,982 B2 | 8/2018 | Chen et al. |
| 10,089,124 B2 | 10/2018 | Barlev et al. |
| 10,176,122 B2 | 1/2019 | Kaplan et al. |
| 10,303,899 B2 | 5/2019 | Durham et al. |
| 2008/0066074 A1 | 3/2008 | Nutter et al. |
| 2012/0030730 A1* | 2/2012 | Smith ............... G06F 21/57 726/2 |
| 2016/0239339 A1 | 8/2016 | Chen et al. |
| 2016/0246629 A1* | 8/2016 | Tsirkin ............. G06F 13/4027 |
| 2017/0177854 A1* | 6/2017 | Gligor .............. G06F 21/44 |
| 2018/0107608 A1 | 4/2018 | Kaplan et al. |
| 2018/0239715 A1 | 8/2018 | Tsirkin et al. |
| 2018/0247082 A1 | 8/2018 | Durham et al. |
| 2019/0052617 A1* | 2/2019 | Chen ................. H04L 9/3234 |
| 2019/0227827 A1* | 7/2019 | Zmudzinski ........ G06F 21/57 |
| 2019/0228145 A1* | 7/2019 | Shanbhogue ...... G06F 13/1668 |
| 2019/0311123 A1* | 10/2019 | Lal .................... G06F 21/57 |
| 2020/0151362 A1* | 5/2020 | Harriman ........... G06F 21/85 |
| 2020/0310972 A1* | 10/2020 | Shanbhogue ...... G06F 21/79 |
| 2021/0294628 A1* | 9/2021 | Tsirkin ............. G06F 9/45558 |
| 2021/0389965 A1 | 12/2021 | Dabak et al. |
| 2022/0091998 A1* | 3/2022 | Lal ................... H04L 41/046 |
| 2023/0115629 A1* | 4/2023 | Balasubramani ... G06F 13/4221 713/310 |

OTHER PUBLICATIONS

Shih-Wei Li, John S. Koh, and Jason Nieh, "Protecting Cloud Virtual Machines from Hypervisor and Host Operating System Exploits", https://www.usenix.org/system/files/sec19-li-shih-wei.pdf, Department of Computer Science, Columbia University, Aug. 14-16, 2019, 19 pages.

David Kaplan et al., AMD Memory Encryption, https://developer.amd.com/wordpress/media/2013/12/AMD_Memory_Encryption_Whitepaper_v7-Public.pdf, Apr. 21, 2016, 12 pages, Advanced Micro Devices.

Mengyuan Li et al., Exploiting Unprotected I/O Operations in AMD's Secure Encrypted Virtualization, https://www.usenix.org/system/files/sec19-li-mengyuan_0.pdf, Aug. 14-16, 2019, 17 pages, The Ohio State University; University of Central Florida.

ZeCoRx—Zero Copy Receive, 1. https://www.mikelangelo-project.eu/technology/zecorx-zero-copy-receive/, 4 pages, downloaded Nov. 27, 2019.

* cited by examiner

500

```
┌─────────────────────────────────────────────────────────────────────────┐
│ Receive, by a virtualized execution enviroment running on a computing   │
│ system, a state measurement associated with a bridge device of the      │
│ computing system.                                                       │
│                                                                         │
│                                   510                                   │
└─────────────────────────────────────────────────────────────────────────┘
                                      │
                                      ▼
┌─────────────────────────────────────────────────────────────────────────┐
│                        Generate an ephemeral key.                       │
│                                                                         │
│                                   520                                   │
└─────────────────────────────────────────────────────────────────────────┘
                                      │
                                      ▼
┌─────────────────────────────────────────────────────────────────────────┐
│ Responsive to validating the state measurement, transmit, to the bridge │
│ device, the ephemeral key encrypted using a device key associated with  │
│ the bridge device.                                                      │
│                                                                         │
│                                   530                                   │
└─────────────────────────────────────────────────────────────────────────┘
                                      │
                                      ▼
┌─────────────────────────────────────────────────────────────────────────┐
│ Transmit, to the bridge device, an access request directed to a         │
│ peripheral device accessible via the bridge device, wherein the access  │
│ request is encrypted using a first value derived from the ephemeral key.│
│                                                                         │
│                                   540                                   │
└─────────────────────────────────────────────────────────────────────────┘
```

FIG. 5

SECURED PERIPHERAL DEVICE COMMUNICATION VIA BRIDGE DEVICE IN VIRTUALIZED COMPUTER SYSTEM

TECHNICAL FIELD

Embodiments of the present disclosure relate to virtualization systems, and more specifically, relate to secured peripheral device communication via bridge device in virtualized computer system.

BACKGROUND

A virtual machine (VM) is a portion of software that, when executed on hardware of a host computer system, creates an environment allowing for an abstraction of some physical components of the host computer system in order to allow running of various modules, for example, multiple operating systems, concurrently and in isolation from other modules. Virtualization permits, for example, consolidating multiple physical servers into one physical server running multiple VMs in order to enhance the hardware utilization rate. The host allocates a certain amount of its resources to each VM. Each VM may then use the allocated resources to execute applications, including operating systems (guest operating systems (OS)). A software layer providing the virtualization may be referred to as a hypervisor, a virtual machine monitor (VMM), or a kernel-based hypervisor, to name a few examples. Hypervisor emulates the underlying hardware of the host computer system, making the use of VM transparent to the guest OS and the user of VM. A VM may have a virtual processor, virtual system memory, virtual storage, and various virtual devices.

BRIEF DESCRIPTION OF THE DRAWINGS

Disclosure is illustrated by way of example, and not by way of limitation, and may be more fully understood with references to the following detailed description when considered in connection with the figures, in which:

FIG. 5 is a flow diagram of a method for secured peripheral device communication via a bridge device in virtualized computer systems, in accordance with embodiments of the present disclosure.

DETAILED DESCRIPTION

Figure 1:
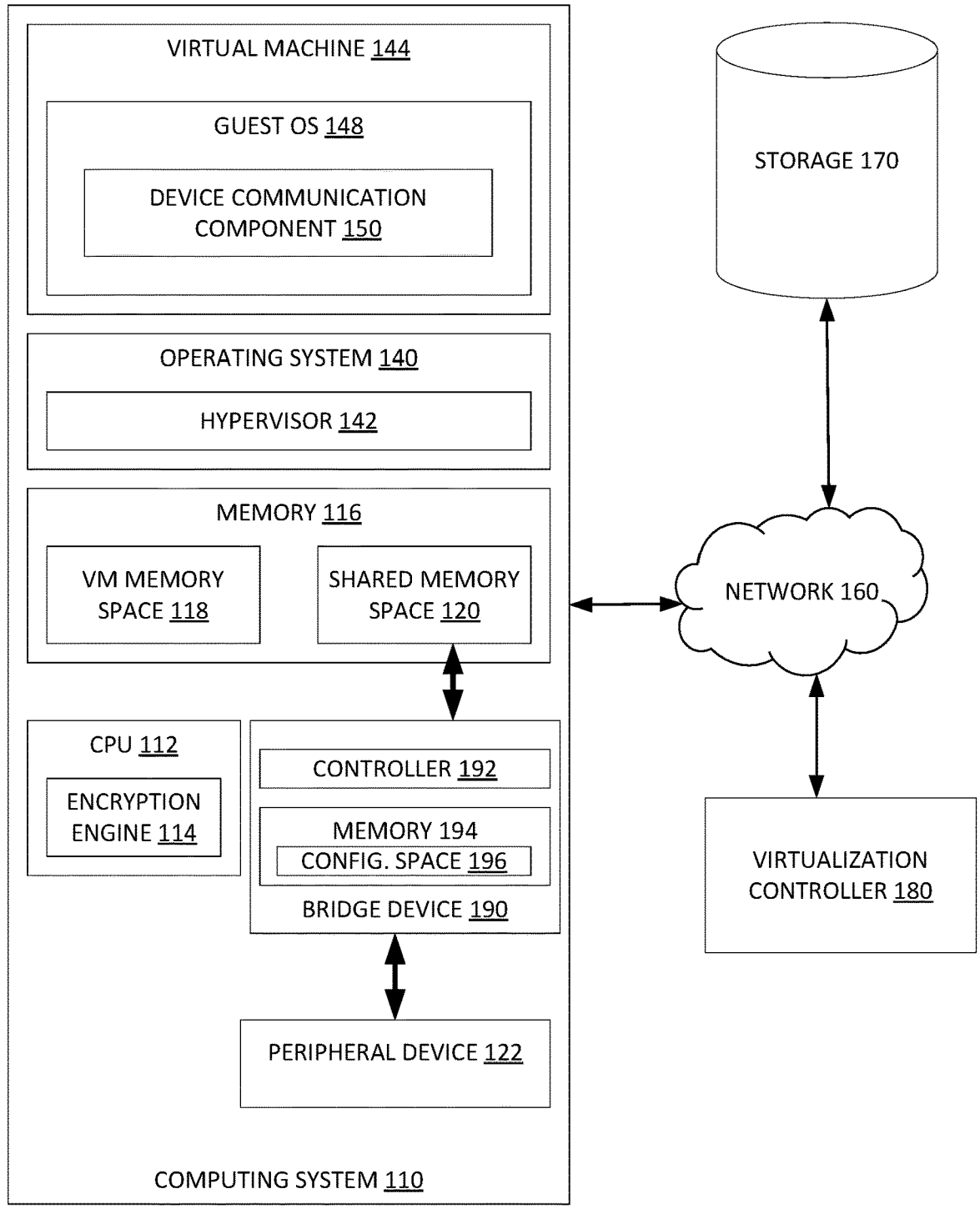
FIG. 1 illustrates a high-level component diagram of an example architecture for a virtualization system, in accordance with one or more aspects of the present disclosure.

Described herein are methods and systems for secured peripheral device communication via bridge device in virtualized computer system. A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system" (or "guest OS"). In virtualized environments, peripheral devices, such as network devices or video cards, may be made available to guests by the hypervisor using a process known as device assignment. In some implementations, bridge devices (e.g., a Peripheral Component Interconnect (PCI)-to-PCI bridge, a Peripheral Component Interconnect express (PCIe)-to-PCIe bridge, etc.) may be implemented to facilitate communication between the guest and underlying assigned peripheral devices.

Direct memory access (DMA) is a hardware feature that enables a hardware component (e.g., a network card, graphics card, etc.) to access the system memory without interacting with a central processing unit (CPU). In virtualized systems, a portion of physical memory of the host computing system may be reserved to facilitate DMA between VM and a peripheral device exposed to VM as a virtual device. For example, a DMA buffer may be reserved in the host memory. In particular, a portion of physical memory of the peripheral device is mapped to an address space of VM. VM may access the DMA buffer through the address space of the VM mapped to the portion of physical memory of the peripheral device. Accordingly, VM and the peripheral device may execute instructions to program data stored in the DMA buffer (e.g., read data stored in the DMA buffer, write data stored in the DMA buffer, etc.).

Encrypted virtualization provides a security paradigm that protects VMs from unauthorized access, e.g., by other VMs and/or a hypervisor that manages VMs. When encrypted virtualization is enabled, an encryption engine (e.g., firmware, circuitry of a processing device, etc.) of the host system may encrypt each memory page of a VM running on the host computer system with an encryption key that is unknown to other VMs and/or the hypervisor. Accordingly, in order to receive data from and transmit to peripheral devices assigned to an encrypted VM, the VM and peripheral devices must encrypt the data to prevent other VMs and/or the hypervisor from accessing the data. However, in some instances the peripheral devices are unable to support encrypting and decrypting of memory. Peripheral devices may include peripheral component interconnect (PCI) devices, peripheral component interconnect express (PCIe) devices, etc.

Aspects of the present disclosure address the above-noted and other deficiencies by providing methods and systems for secured peripheral device communication via bridge device in virtualized computer system (e.g., communications between a virtual machine (VM) and the peripheral device behind a bridge device).

Responsive to assignment of a peripheral device behind a bridge device to a VM running on a computing system to perform input/output operations on the peripheral device connected via the bridge device, the bridge device transmits a state measurement associated with the bridge device to VM. The state measurement may be encrypted with a private cryptographic key associated with the bridge device. In some embodiments, the state measurement associated with the bridge device is a hash function of the contents of the memory and registers of the bridge device. Depending on the embodiment, the state measurements may include a hash of the firmware of the bridge device and/or a hash of the bridge device state. In some embodiments, the state measurement may also include a device identification (device ID) of the peripheral device behind the bridge device. Depending on the embodiment, the state measurement may be cryptographically signed using the device key or an electronic signature associated with a vendor and/or manufacturer of the bridge device.

In an embodiment, responsive to receiving the state measurement, if the state measurement is encrypted, VM may decrypt the state measurement using a device key of the bridge device. The device key of the bridge device may be associated with the private cryptographic key of the bridge device. Additionally, if the state measurement is electronically signed, VM may verify the electronic signature accompanying the state measurement. Electronic signature is verified using a predetermined electronic signature indicated by a vendor and/or manufacturer of the bridge device. Verification processes confirm that the state measurement is associated with a specific bridge device. Accordingly, VM may validate the state measurement associated with the bridge device. Validating the state measurement may include comparing the state measurement received from the bridge device with an expected state measurement of the bridge device (e.g., firmware is up-to-date or an expected version and/or the device state is an expected device state according to vendor/manufacturing specification). The expected state measurement of the bridge device may be provided by a manufacturer and/or a vendor of the bridge device. For example, the manufacturer and/or vendor of the bridge device may provide a most recent firmware version of the bridge device. Additionally, validating the state measurement associated with the bridge device may include comparing the device ID with an identification associated with the peripheral device behind the bridge device assigned to the VM.

In an embodiment, VM generates an ephemeral key. The ephemeral key may be generated by applying a predetermined transformation (such as a cryptographic hash function) to an ephemeral value (e.g., a random number). In some embodiments, VM may generate the ephemeral key from the ephemeral value and device key by applying a predetermined transformation (such as a cryptographic hash function) to the ephemeral value and the public cryptographic key of bridge device. In some embodiments, VM may generate the ephemeral key from the ephemeral value and the received state measurement of the bridge device by applying a predetermined transformation (such as a cryptographic hash function) to the ephemeral value and the public cryptographic key of bridge device. In some embodiments, VM may generate the ephemeral key from the ephemeral value, the received state measurement of the bridge device, and/or the device key by applying a predetermined transformation (such as a cryptographic hash function) to the ephemeral value, the received state measurement of the bridge device, and/or the public cryptographic key of bridge device.

Upon validation of the state measurement, VM may transmit the ephemeral key encrypted using the public key of the bridge device. In some embodiments, the ephemeral key may be encrypted using the ephemeral key or a value derived from the ephemeral key. Once the bridge device receives the ephemeral key, the bridge device stores the ephemeral key for use in future communications from VM. Additionally, future communications from the peripheral device may be provided to the bridge device to be encrypted using the ephemeral key and transmitted to the VM to be decrypted using the ephemeral key.

In some embodiments, the bridge device may periodically obtain a current state measurement of the bridge device. The current state measurement of the bridge device may be compared to a stored state measurement (e.g., a state measurement that has been validated by the VM). Upon determining that the current state measurement of the bridge device does not match the stored state measurement, the bridge device may reset the peripheral device assigned to the VM. Resetting the peripheral device may include a link-level reset, a function-level reset, or any other vender specific reset capability associated with the peripheral device. In some embodiments, the bridge device may also initiate an interrupt or transmit an interrupt (e.g., a non-maskable interrupt (NMI)) to the VM, which may be a notification or alert indicating that the peripheral device behind the bridge device has been reset. The interrupt from the bridge device may stop the VM from running.

Accordingly, aspects of the present disclosure significantly improves the overall security of an encrypted VM by eliminating the vulnerability and system latency during each transmission of data between VM and an assigned peripheral device. Further, aspects of the present disclosure prevent a malicious hypervisor and/or other VMs from manipulating configurations of a bridge device in connection with the peripheral device. In particular, communication between the VM and the bridge device, which has unencrypted communication with the peripheral device, may be encrypted using a shared ephemeral key, which is reset upon manipulation of the configuration of the bridge device.

FIG. 1 illustrates a virtualization system 100 in which embodiments of the present disclosure may operate. It should be noted that other architectures for virtualization system 100 are possible, and that the implementation of a virtualization system 100 utilizing embodiments of the disclosure are not necessarily limited to the specific architecture depicted by FIG. 1.

Virtualization system 100 may include a computing system 110, one or more storage devices 170 and a virtualization controller 180, which may all be communicably connected over a network 160. Virtualization system 100 may be a processing device (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to implement secure communication during virtualization, in accordance with the present disclosure.

Network 160 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In some implementations, computing system 110 may belong to a cluster comprising additional computer systems not depicted in FIG. 1, while in some other implementations, computing system 110 may be an independent system that is capable of communicating via network 160.

Computing system 110 may include hardware components, such as a physical central processing unit (CPU) 112. One or more processors may be embodied as CPU 112, which may be and/or include a micro-processor, digital signal processor (DSP), or other processing component. CPU 112 may process various received data and may carry out the code or instructions or one or more computer programs, for example, to provide input/output operations specified by the instructions. Computing system 100 may further include memory 116 and one or more peripheral devices 122.

Memory 116 may include volatile memory devices (e.g., random access memory (RAM)), non-volatile memory devices (e.g., flash memory), storage devices (e.g., a magnetic hard disk, a Universal Serial Bus (USB) solid state drive, a Redundant Array of Independent Disks (RAID) system, a network attached storage (NAS) array, etc.), and/or other types of memory devices. It should be noted that even though a single CPU 112 is depicted in FIG. 1 for computing system 100, this is merely illustrative, and that in some other examples, computing system 100 may include a two or more CPUs. Similarly, in some other examples, computing system 100 may include two or more memory components, rather than a single memory component.

Computing system 110 may host one or more virtual execution environments, such as containers or VMs (VMs), such as VM 144. Computing system 110 may execute an operating system 140 (e.g., a host OS) to manage its resources. Each VM may execute a guest OS 148. Computing system 110 may execute hypervisor 142 to virtualize access to underlying host hardware, making the use of VMs running on computing system 110 transparent to the guest OS 148 running on VMs and users (e.g., a system administrator) of computing system 110.

Bridge device 190, such as a PCI-to-PCI bridge, refers to a central device that connects CPU and memory via a PCI express switch to one or more peripheral devices, such as a peripheral device 122. The bridge device 190 generates transaction request on behalf of the CPU and forwards the transaction request to the peripheral devices. The bridge device may be a Peripheral Component Interconnect (PCI)-to-PCI bridge, which may be represented as a PCI Express Root Port. As noted above, the bridge device may be interconnected between the computing system 110 and the peripheral devices.

Bridge device 190 may include a device controller 192 and a local device memory 194. Device controller 192 executes DMA operations stored in the local device memory 194, in accordance with embodiments described below. For example, a portion of the local device memory 194 associated with bridge device 190 may be mapped to an address space of VM 144 to execute instructions. In some instances, program data stored in a DMA buffer reserved in the memory 116 (e.g., read data stored in the DMA buffer, write data stored in the DMA buffer, etc.). Local device memory 194 may include volatile memory devices, non-volatile memory devices, storage devices, and/or other types of memory devices. Local device memory 194 may include a configuration space 196. Configuration space 196 may be a portion of local device memory 194 allocated to facilitate configuration of bridge device 190 by computing system 110. For example, configuration space 196 may store a device key (or public key) associated with bridge device 190. The device key may be externally provisioned and programmed during or post-manufacturing. In some instances, the device key may be generated by bridge device 190 by combining the content (e.g., bridge device identification, manufacturer identification, and/or other identification information associated with the bridge device) of the portion of local device memory 194 allocated to facilitate configuration of bridge device 190 with input(s) from some entropy source(s), such as timer, network, etc.

Device controller 192 may facilitate secure communication with computing system 110 using the device key. In some embodiments, configuration space 196 may include a shared portion (or public portion) and a private portion. Shared portion may be a portion of configuration space 196 that is accessible to VM 144. Private portion may be a portion of configuration space 196 that is encrypted using an encryption key. In some embodiments, the private portion may be accessible by VM 144 using the encryption key provided by bridge device 190.

Peripheral device 122, such as, a Peripheral Component Interconnect device is a hardware device connected to a PCI bus or a PCI switch of a bridge device 190, and performs an input operation and/or an output operation upon receiving a request from the host (e.g., via the bridge device 190). Examples of a peripheral device include for an input operation, a mouse, keyboard, graphics tablet, barcode reader, game controller, light pen, light gun, microphone, digital camera, webcam, dance pad, and read-only memory; for an output operation, a printer, computer monitor, projector, headphones, computer speaker; and for an input and output operation, a disk drive, USB flash drive, memory card and tape drive. In some embodiments, peripheral device 122 may be a storage device or a networking device. For example, peripheral device 122 may be a PCI device or a Peripheral Component Interconnect express (PCIe) device. Depending on the embodiment, peripheral device 122 may be a full PCIe device, a virtual function as part of a PCIe device, or a sub function as part of PCIe device.

VM 144 may include a device communication component 150 that encrypts communication from VM 144 to the peripheral device 122 accessible via the bridge device 190. Accordingly, the communication between bridge device 190 and VM 144 is protected from other VMs and hypervisor 142. In one embodiment, device communication component 150 may be implemented as hardware circuitry of a CPU 112. In some implementations, device communication component 150 may be provided as firmware installed on computing system 110. In some embodiments, device communication component 150 may be configured to encrypt communication from VM 144 to bridge device 190 using an ephemeral key.

Figure 2A:
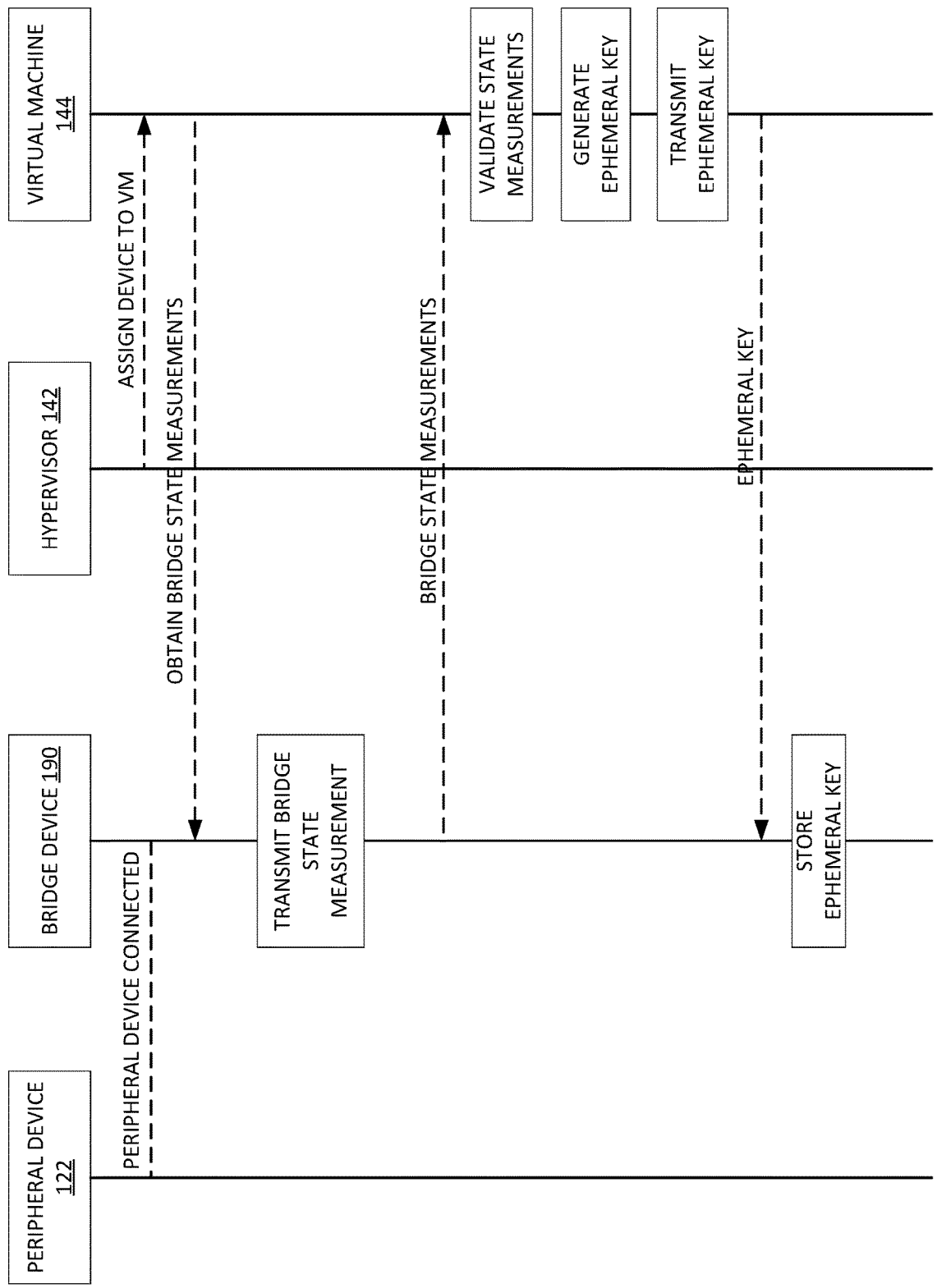
FIG. 2A-C illustrative interaction diagram of a secured peripheral device communication via a bridge device in virtualized computer systems, in accordance with embodiments of the present disclosure.
Figure 2B:
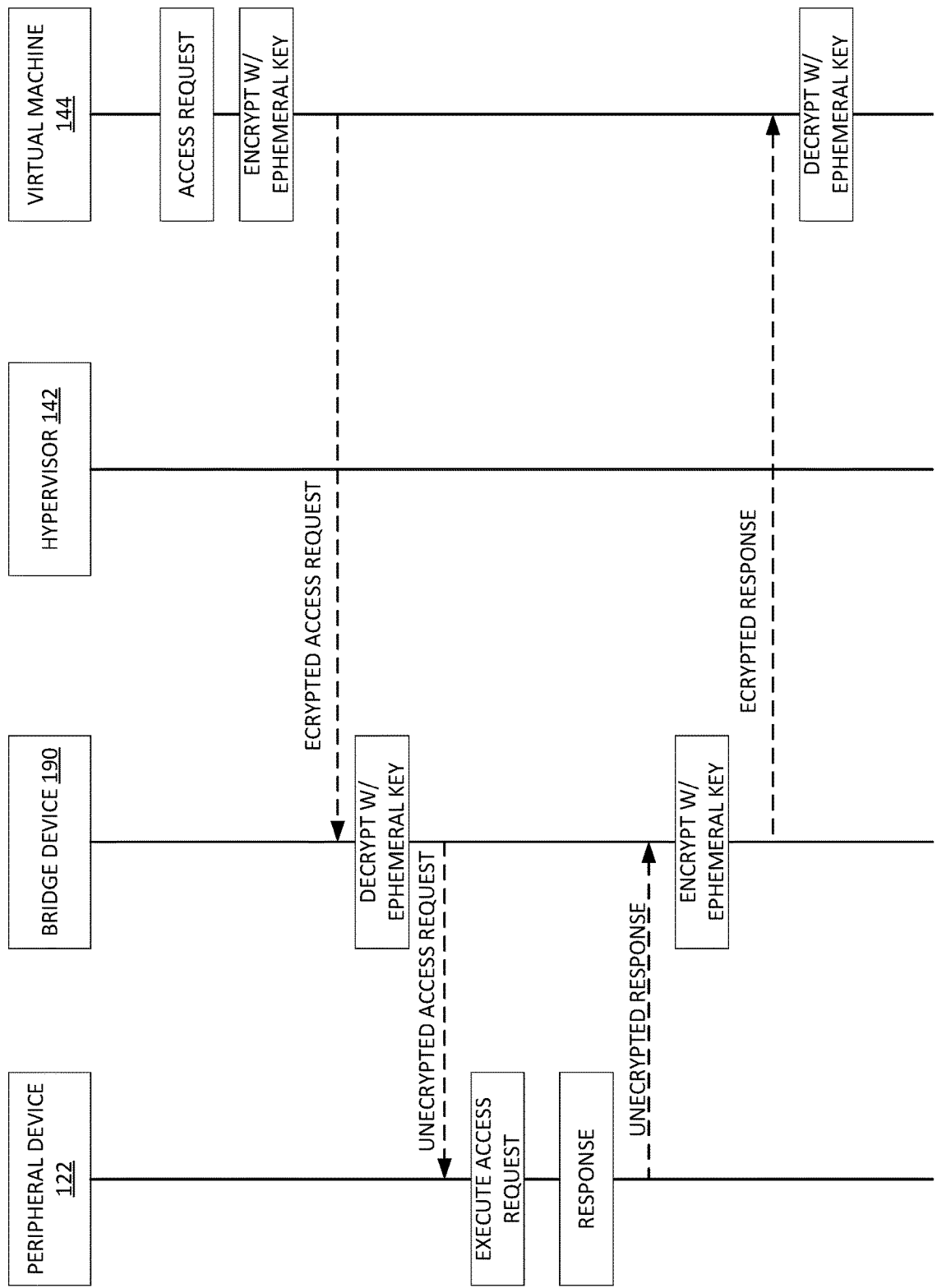
Figure 2C:
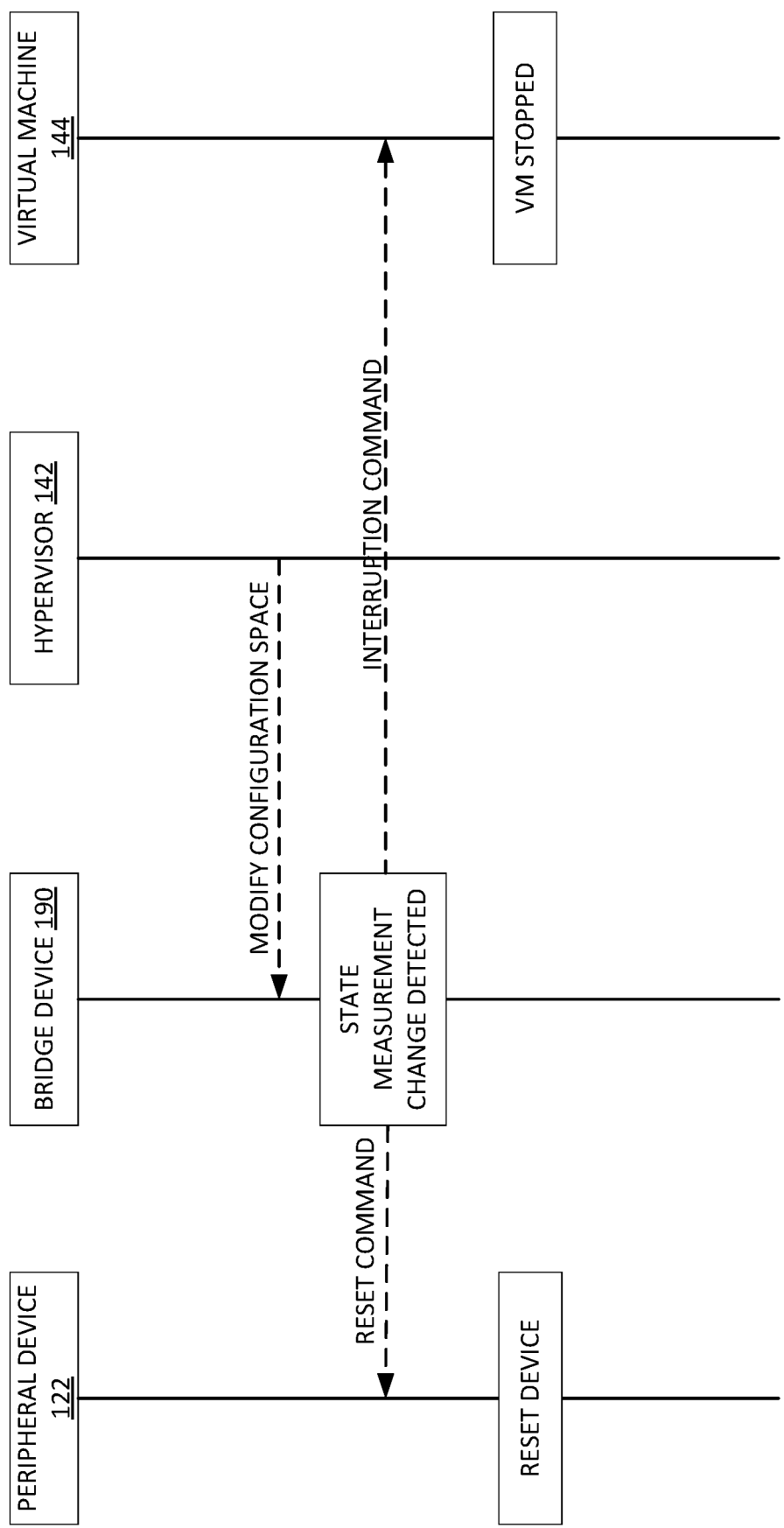

FIG. 2A-C illustrates an interaction diagram 200 of secured peripheral device communication via a bridge device between a peripheral device and a VM operating on a computing system, in accordance with embodiments of the present disclosure. Peripheral device may be peripheral device 122, the bridge device may be bridge device 190, and VM may be VM 144, described with respect to FIG. 1.

Referring to FIG. 2A, hypervisor (such as hypervisor 144 of FIG. 1) may assign peripheral device 122 connected via bridge device 190 to VM 144, in accordance with embodiments described above. VM 144 may obtain a state measurement of bridge device (e.g., bridge) 190 from bridge device 190. As previously described, the state measurements may be a snapshot of the memory and registers of the bridge device (e.g., firmware of the bridge device and/or memory state associated with the bridge device). Bridge device 190 may cryptographically sign the state measurements with a private key associated with bridge device 190. Cryptographic signature is a method of computing a hash of a message and encrypting the hash with a cryptographic key (e.g., the private key). Receiver of the message may decrypt the hash with the public key of the message sender and compare the hash supplied with the message with a hash computed by the receiver, thus verifying that the message has not been tampered with. Once the state measurement has been cryptographically signed, bridge device 190 may transmit the state measurement to VM 144.

In some embodiments, bridge device 190 may expose the public key by storing it in configuration space 196 of memory 194. For example, bridge device 190 may store the public key in the shared portion of configuration space 196. In some embodiments, VM 144 may retrieve the state measurements and/or the public key from configuration space 196 of memory 194. For example, VM 144 may retrieve the state measurements and/or the public key from the shared portion of configuration space 196. In other or similar embodiments, VM 144 may receive the state measurements and/or the public key from bridge device 190 or hypervisor 142. For example, bridge device 190 may transmit (e.g., storing the state measurements and/or the public key in the configuration space 196) the state measurements and/or the public key to VM 144.

Responsive to receiving the state measurement, VM 144 may validate the state measurement by comparing the received state measurement with a known state measurement. The known state measurement may be provided by a manufacturer and/or vendor to the VM 144. In some embodiments, VM 144 may verify the electronic signature associated with the state measurements. For example, VM 144 may have access to a trusted device data structure including identifiers of one or more devices that are trusted by guest OS 148. A device may be determined to be trusted by guest OS 148 in response to a determination that the device satisfies one or more security and/or privacy conditions pertaining to the operation of VM 144 on computing system 110. VM 144 may compare the electronic signature of the bridge device 190 used to sign the ephemeral key with each identifier included in the trusted device data structure. In response to determining that the electronic signature matches an identifier included in the trusted device data structure, VM 144 may determine that bridge device 190 is a trusted device.

Once the state measurements are validated and/or bridge device 190 is determined to be a trusted device, the virtual machine may further confirm that the state measurements (e.g., firmware of the bridge device and/or bridge device state associated with the bridge device) are as expected for bridge device 190. For example, that the firmware of bridge device 190 is an expected version and/or that the state of bridge device 190 is an expected state according to vendor and/or manufacturer. The expected version and/or value to validate the state measurements associated with the bridge device and/or bridge device itself is received by the VM from the bridge device manufacturer and/or vendor and stored in a secure memory of the VM.

In some embodiments, responsive to validating the state measurements, VM 144 may generate an ephemeral key. The ephemeral key may be generated, e.g., by applying a predetermined transformation to an ephemeral value and/or the public key to generate the ephemeral key. The ephemeral value may be an arbitrary number that is used once in a single cryptographic communication between VM 144 and bridge device 190. In other or similar embodiments, CPU 112 may generate the ephemeral value, and VM 144 may retrieve the ephemeral value from CPU 112. Predetermined transformation, which maps its arguments (e.g., the ephemeral value and the public key) to an output value (e.g., the ephemeral key), may be represented, for example, by a mathematical function, such as a cryptographic hash function. VM 144 may also generate the ephemeral key directly from the ephemeral value and the public key without the predetermined transformation. In another embodiment, VM 144 may also generate the ephemeral key from the public key with or without the predetermined transformation. In yet another embodiment, VM 144 may also generate the ephemeral key from the ephemeral value with the predetermined transformation. Ephemeral key may be used as a symmetric key to decrypt and encrypt access requests between peripheral device 122 and VM 144 sent to and received from bridge device 190.

VM 144 may transmit to bridge device 190 the ephemeral key encrypted by the public key of the bridge device. In some embodiments, VM 144 may transmit, together with the ephemeral key, the validated state measurement associated with bridge device 190. In some embodiments, VM 144 may store the ephemeral key and the validated state measurement encrypted with the public key in the shared portion of configuration space 196, and device controller 192 may retrieve the ephemeral key (and validated state measurement) encrypted with the public key from the shared portion of configuration space 196.

Responsive to receiving the ephemeral key (and validated state measurement), bridge device 190 may decrypt the ephemeral key (and validated state measurement) (e.g., using its private key). Bridge device 190 may store the decrypted ephemeral key (and validated state measurement) in a private location of the memory 194 of bridge device 190. Responsive to sending the ephemeral key (and validated state measurement) to bridge device 190, VM 144 may use the ephemeral key to encrypt access requests directed to peripheral device 122.

Referring to FIG. 2B, VM 144 may initiate an access request directed to peripheral device 122. VM 144 may identify an ephemeral key associated with bridge device 190 connected to peripheral device 122. VM 144 transmits the access request encrypted to bridge device 190. Bridge device 190 decrypts the access request using the ephemeral key associated with VM 144. Upon decrypting the access request directed to the peripheral device 122, bridge device 190 may transmit the decrypted access request to the peripheral device 122 to be executed on the peripheral device 122.

Additionally, and/or alternatively, responsive to receiving the access request, the peripheral device 122 may transmit an unencrypted response to bridge device 190 to be forwarded to VM 144. Bridge device 190 may determine that the VM 144 has a corresponding ephemeral key to encrypt responses from peripheral device 122 to VM 144 for secure communication. Responsive to determining that VM 144 has a corresponding ephemeral key, bridge device 190 encrypts the unencrypted response from peripheral device 122. Bridge device 190 may transmit the encrypted response to VM 144. VM 144 may decrypt the encrypted response using the ephemeral key to be forwarded to VM 144. Upon decrypting the response from the peripheral device 122, VM 144 receives the response from the peripheral device 122 via bridge device 190.

Referring to FIG. 2C, hypervisor 142 may attempt to modify a configuration space of bridge device 190. Bridge device 190 may detect that the configuration space of bridge device 190 has been modified. In particular, prior to transmission of an access request and/or response (whether encrypted or decrypted) directed to a connected device (e.g., VM 144 and/or peripheral device 122) of the bridge device 190, bridge device 190 obtains a current state measurement of the configuration space of bridge device 190 to be compared to the stored validated state measurement. Upon determining that the current state measurement matches the stored validated state measurement, bridge device 190 may proceed with transmission of the access request directed the connected device of the bridge device 190, as previously described. Upon determining that the current state measurement does not match the stored validated state measurement, bridge device 190 may transmit a device reset command to peripheral device 122 and/or an interrupt command to VM 144. As a result, the peripheral device 122 may be reset and VM 144 may be suspended (e.g., stopped from running).

Figure 3:
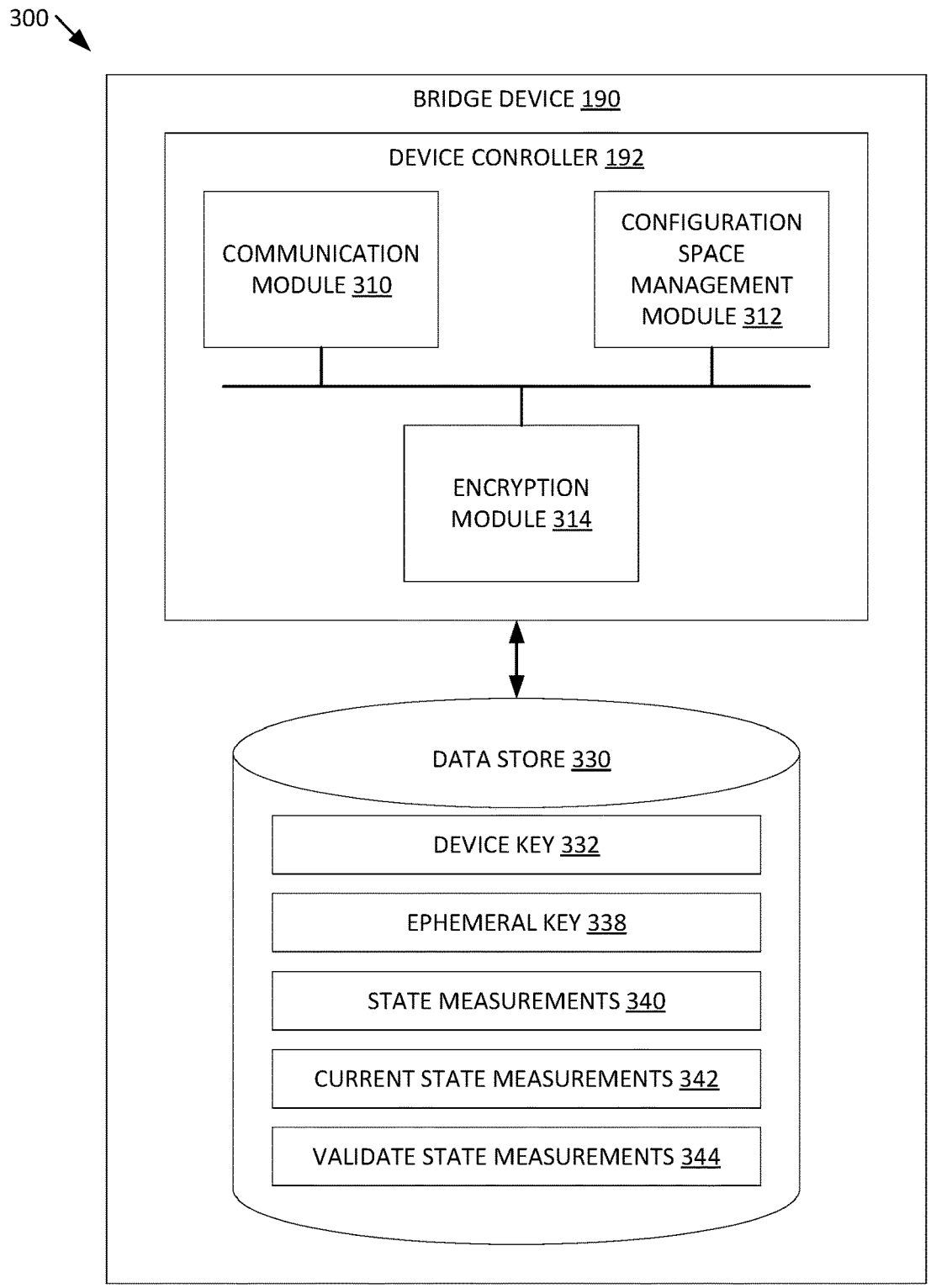
FIG. 3 depicts a block diagram illustrating an example of a bridge device connected to a computing system, in accordance with embodiments of the present disclosure.

FIG. 3 depicts a block diagram illustrating an example 300 of a bridge device connected between a peripheral device and a computing system, in accordance with embodiments of the present disclosure. In some embodiments, the bridge device may be bridge device 190, described with respect to FIG. 1. Bridge device 190 may include device controller 192 and a data store 330.

As illustrated, device controller 192 may include a communication module 310, a configuration space management module 312, and an encryption module 314.

Communication module 310 may communicate with data store 330 storing a device key, also previously referred to as a public key (e.g., a device key 332), and an ephemeral key 338. In some embodiments, data store 330 may include one or more portions of memory 116. In other or similar embodiments, data store 330 may include one or more portions of configuration space 196.

Device controller 192 may generate a snapshot all the variables (e.g., firmware of bridge device 190 and/or bridge device state) of bridge device 190 (e.g., state measurements 340) and store the state measurement 340 in data store 330. As previously described, state measurement 340 may include a hash of the firmware of bridge device 190 and/or a hash of the bridge device state.

Communication module 310 may further communicate with various components of computing system 110, such as hypervisor 142 and guest OS 148. For example, communication module 310 may expose device key 332 to VM 144 by transmitting device key 332 to VM 144, in accordance with previous embodiments. In another example, communication module 310 may provide device key 332 to VM 144 by storing device key 332 in a predetermined portion of memory, such as the portion of configuration space 196 that is accessible only to VM 144 (i.e., the private portion of configuration space 196).

Communication module 310 may also receive communications (e.g., access requests, messages, or any other suitable communications) transmitted to bridge device 122.

For example, communication module 310 may receive ephemeral key 338 encrypted with the device key from VM 144, in accordance with previously described embodiments. In some embodiments, communication module 310 may receive a validated state measurement 342 with ephemeral key 338 encrypted with the device key from VM 144, in accordance with previously described embodiments. Responsive to receiving the encrypted ephemeral key 338 (and validated state measurement 342), encryption module 314 may decrypt the ephemeral key 338 (and validated state measurement 342) encrypted with the device key. In response to decrypting the ephemeral key (and validated state measurement 342) encrypted with the device key from VM 144, the communication module 310 may store ephemeral key 338 (and validated state measurement 342) in a private portions of the data store 330. Accordingly, the bridge device 122 may begin receiving and/or transmitting encrypted access requests and/or responses to and from virtual machines 144.

In another example, communication module 310 may receive encrypted access request from VM 144 (encrypted using ephemeral key 338) directed to peripheral device 122, in accordance with previously described embodiments. Responsive to receiving the encrypted access request, encryption module 314 may decrypt the access request using ephemeral key 338. In yet another example, communication module 310 may receive an access request from peripheral device 122 directed to VM 144, in accordance with previously described embodiments. Responsive to receiving the access request, encryption module 314 may encrypt the access request using ephemeral key 338 associated with VM 144.

Prior to forwarding encrypted response based on an executed access request on the peripheral device 122 to VM 144 and/or decrypted access request to peripheral device 122 by communication module 310, configuration space management module 312 may monitor the configuration space 196 of bridge device 190 to determine whether the configuration space has been modified. Configuration space management module 312 may obtain a current state measurement (e.g., update state measurements 340 with currently obtained state measurement) and store the current state measurement as state measurement 340. Configuration space management module 312 may compare state measurements 340 (e.g., current state measurements) with validated state measurements 342 (e.g., state measurement previously validated to receive the ephemeral key 338). Accordingly, configuration space management module 312 verifies that bridge device 190 has not been tampered with by any other VM and/or malicious hypervisor. In particular, that the other VM and/or malicious hypervisor has not modified the configuration space of bridge device 190 to intercept or receive communication to and/or from the peripheral device 122 and/or VM 144.

Responsive to verifying that the state measurements 340 matches the validated state measurements 342, communication module 310 may forward the encrypted access request to VM 144 and/or decrypted access request to peripheral device 122. Responsive to verifying that the state measurements 340 does not match the validated state measurements 342, the communication module 310 may transmit to VM 144, an interrupt command. Typically the interrupt command is interpreted by VM 144 as an indication that bridge device 190 is no longer trusted due to a malicious hypervisor and/or other VMs attempting to tamper with bridge device 122 (e.g., unmapping of bridge device 122, altering one or more keys associated with bridge device 122, etc.). VM 144 may decide to stop running or handle the interrupt in a manner to protect itself from the malicious hypervisor and/or other VMs. Additionally, and/or alternatively, the communication module 310 may transmit to peripheral device 122, a reset command that is typically interpreted by peripheral device 122 as an indication to reset the peripheral device 122.

Figure 4:
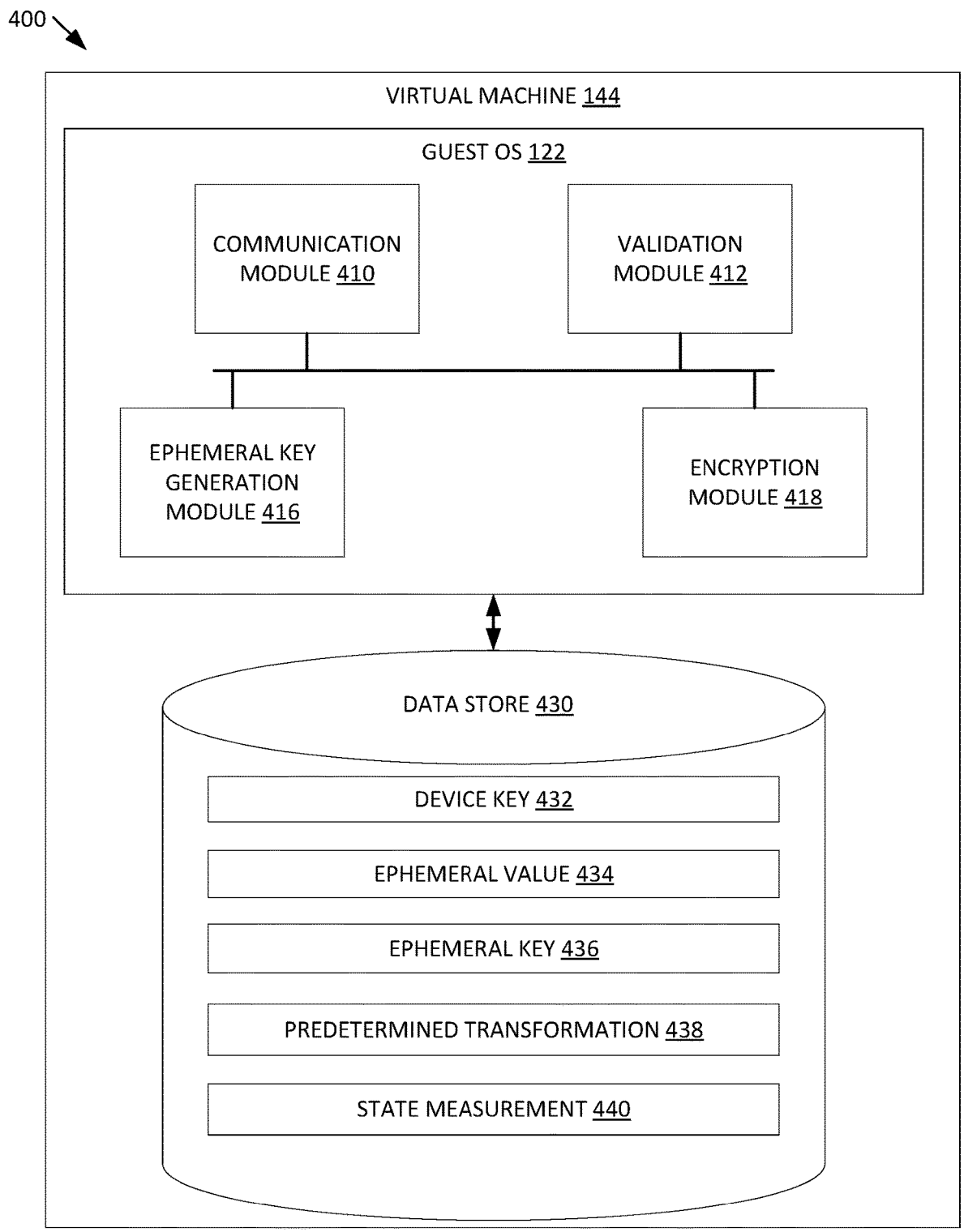
FIG. 4 depicts a block diagram illustrating an example of the guest operating system (OS) of a VM running on a computing system, in accordance with embodiments of the present disclosure.

FIG. 4 depicts a block diagram illustrating an example virtualization system 400 of the guest operating system (OS) of a VM running on a computing system, in accordance with embodiments of the present disclosure. In some embodiments, the guest OS may be guest OS 148 of VM 144, described with respect to FIG. 1. Guest OS 148 may include VM 144 and data store 430.

As illustrated, VM 144 may include a communication module 410, a validation module 412, an ephemeral key generation module 416, and an encryption module 418. Communication module 410 may communicate with data store 430, storing a device key 432, an ephemeral value 434, an ephemeral key 436, a predetermined transformation 438, and state measurements 440, including one or more trusted devices. In some embodiments, data store 430 may include one or more portions of memory 116. In other or similar embodiments, data store 430 may include one or more portions of VM memory space 118.

Communication module 410 may further communicate with various components of computing system 110, such as hypervisor 142 and peripheral device 122. For example, communication module 410 may receive state measurements 440 (e.g., state measurements 340 of FIG. 3) encrypted using device key (or public key) (e.g., device key 332 from bridge device 190), in accordance with previously described embodiments. Responsive to receiving state measurements 440, communication module 410 may provide state measurements 440 to validation module 412 to validate state measurements 440 by using the device key to decrypt a computed hash associated with state measurements 440 and compare the computed hash with a hash of state measurements 440 re-computed by VM 144. Accordingly, validation module 412 verifies that state measurements 440 have not been tampered with. Once the state measurements are validated, the validation module 412 may further confirm that the state measurements 440 (e.g., the firmware of the peripheral device and/or peripheral device state associated with the peripheral device) are as expected for bridge device 190. For example, that the firmware of bridge device 190 is an expected version and/or that the state of bridge device 190 is an expected state according to vendor and/or manufacturer. Depending on the embodiment, validation module 412 may store state measurements 440 (e.g., validated state measurement) in data store 430.

Upon validation of the state measurements 440, ephemeral key generation module 416 may generate an ephemeral key 436. In some embodiments, an ephemeral value 434 may be used to produce the ephemeral key 436, in accordance with previously described embodiments. In some embodiments, ephemeral key generation module 416 may generate ephemeral value 434 prior to communication module 410 receiving the state measurements 440. In other or similar embodiments, ephemeral key generation module 416 may generate ephemeral value 434 in response to validation module 412 validating the state measurements 440. Responsive to generating the ephemeral value 434, ephemeral key generation module 416 may store the ephemeral value 434 in the data store 430.

Ephemeral key generation module 416 may generate ephemeral key 436 using device key 432, the ephemeral value 434, and the predetermined transformation 438. Ephemeral key generation module 416 may apply the predetermined transformation 438 to device key 432 and the ephemeral value 434 to generate ephemeral key 436. Key generation module 412 may generate ephemeral key 436, in accordance with previously described embodiments. Responsive to generating ephemeral key 436, ephemeral key generation module 416 may store ephemeral key 436 in the data store 430.

Responsive to ephemeral key generation module 416 generating and/or storing generating ephemeral key 436, communication module 410 may transmit ephemeral key 436 to bridge device 190. In some embodiments, upon validation of the state measurements 440, communication module 410 may transmit ephemeral key 436 to bridge device 190. In some embodiments, communication module 410 may transmit state measurements 440 (e.g., state measurements validated by validation module 412) with ephemeral key 436 to bridge device 190. Encryption module 418 may encrypt ephemeral key 436 (and state measurements 440) with device key 432 prior to communication module 410 transmitting the ephemeral key 436 (and state measurements 440) to bridge device 190. Accordingly, VM 144 may begin receiving and/or transmitting encrypted access requests to or from bridge device 190 directed to or from peripheral device 122.

Responsive to receiving an access request from an application running on VM 144 directed to peripheral device 122 via bridge device 190, communication module 410 identifies ephemeral key 436 associated with bridge device 190. Access request is provided to encryption module 418 prior to transmitting the access request to bridge device 190.

Encryption module 418 encrypts the access request with ephemeral key 436. Once the access request is encrypted, communication module 410 transmits the access request to bridge device 190. Responsive to bridge device 190 receiving and decrypting the access request and validating security of the bridge device 190, in accordance with previously described embodiments, the communication module 410 may receive an indication from bridge device 190 that the access request was forwarded to peripheral device 122. Responsive to bridge device 190 receiving and decrypting the access request and the validation of bridge device 190 failing, in accordance with previously described embodiments, the communication module 410 may receive an interrupt command. Communication module 410 may include an interrupt handler or may be a separate module. Accordingly, communication module 410 may determine that the interrupt command is an indication that bridge device 190 is unable to forward the access request due to a malicious hypervisor and/or other VMs attempting to tamper with bridge device 190 (e.g., unmapping of bridge device 190, altering one or more keys associated with bridge device 190, etc.).

Responsive to receiving an encrypted access request from bridge device 190, communication module 410 identifies ephemeral key 436 associated with bridge device 190. Encrypted access request is provided to encryption module 418 to be decrypted using the ephemeral key 436. Once the access request is decrypted, the access request is executed on VM 144.

FIG. 5 depicts a flow diagram of an illustrative example of a method 500 for secured peripheral device communication via a bridge device in virtualized computer systems, in accordance with one or more aspects of the present disclosure. Method 500 and each of its individual functions, routines, subroutines, or operations may be performed by one or more processors of the computer device executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processes implementing method 500 may be executed asynchronously with respect to each other.

For simplicity of explanation, the methods of this disclosure are depicted and described as a series of acts. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. Term "article of manufacture," as used herein, is intended to encompass a computer program accessible from any computer-readable device or storage media. In one implementation, method 500 may be performed by a kernel of a hypervisor as shown in FIG. 1 or by an executable code of a host machine (e.g., host operating system or firmware), a virtual machine (e.g., guest operating system or virtual firmware), other executable code, or a combination thereof.

Method 500 may be performed by processing devices of a server device or a client device and may begin at block 510. At block 510, the processing device receives, by a virtualized execution environment running on a computing system, a state measurement associated with a bridge device of the computing system. In some embodiments, the virtualized execution environment may be represented a virtual machine or a container. In some embodiments, the bridge device is a Peripheral Component Interconnect (PCI)-to-PCI bridge. The bridge device may be a physical bridge device or a virtual bridge device.

At block 520, the processing device generates an ephemeral key. To generate the ephemeral key, the processing device generates an ephemeral value to be used to generate the ephemeral key. In some embodiments, the processing device, to generate the ephemeral key, applies a predetermined transformation on an ephemeral value (e.g., short-term value) and the device key. The ephemeral key may be generated using any method for generating a cryptographic key, in accordance with the previously described embodiments.

At block 530, responsive to validating the state measurement, the processing device transmits, to the bridge device, an access request directed to a peripheral device accessible via the bridge device. The access request is encrypted using a value derived from the ephemeral key. To validate the state measurement, the processing device compares the state measurement of the bridge device with an expected state measurement of the bridge device. As previously described, the validations verifies whether the bridge device has been tampered with.

Once the device key is validated, the processing device compares the state measurement with an expected state measurement. As previously described, comparing the state measurement received by the peripheral device with an expected state measurement of the peripheral device (e.g., firmware is up-to-date or an expected version and/or the device state is an expected device state according to vendor/manufacturing specification).

At block 540, the processing device transmits, to the bridge device, an access request directed to a peripheral device accessible via the bridge device encrypted using a value derived from the ephemeral key. In some embodiments, the peripheral device may be a Peripheral Component Interconnect express (PCIe) device, a virtual function of the PCIe device, or a sub-function of the PCIe device. To transmit the ephemera key, the processing device transmit with the ephemeral key the validated state measurement. The ephemeral key and the validated state measurement may be encrypted using the device key associated with the bridge device. In some embodiments, the access request may be initiated by an application of the virtualized execution environment running on the computing system.

Depending on the embodiment, the processing device receives an indication, in response to determining that a configuration space of the bridge was not altered, that the access request was decrypted using the value and forwarded to the peripheral device accessible via the bridge device.

Depending on the embodiment, the processing device receives an interrupt indicating that a configuration space of the bridge device has been altered. Responsive to receiving the interrupt by the virtualized execution environment, the processing device suspends the virtualized execution environment.

Figure 6:
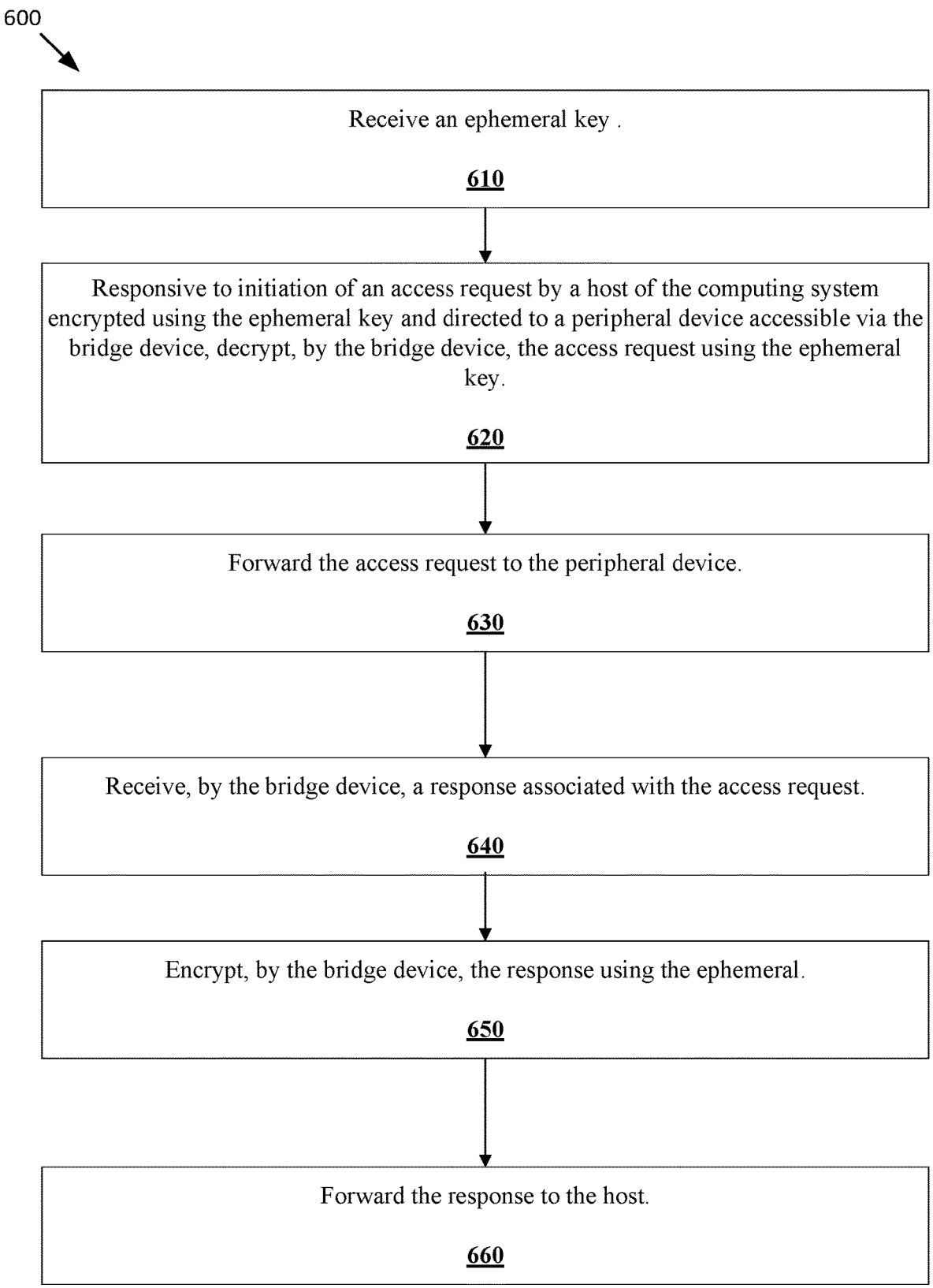
FIG. 6 is a flow diagram of another method for secured peripheral device communication via a bridge device in virtualized computer systems, in accordance with embodiments of the present disclosure.

FIG. 6 depicts a flow diagram of an illustrative example of a method 600 for secured peripheral device communication via a bridge device in virtualized computer systems, in accordance with one or more aspects of the present disclosure. Method 600 and each of its individual functions, routines, subroutines, or operations may be performed by one or more processors of the computer device executing the method. In certain implementations, method 600 may be performed by a single processing thread. Alternatively, method 600 may be performed by two or more processing threads, each thread executing one or more individual functions, routines, subroutines, or operations of the method. In an illustrative example, the processing threads implementing method 600 may be synchronized (e.g., using semaphores, critical sections, and/or other thread synchronization mechanisms). Alternatively, the processes implementing method 600 may be executed asynchronously with respect to each other.

For simplicity of explanation, the methods of this disclosure are depicted and described as a series of acts. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. Term "article of manufacture," as used herein, is intended to encompass a computer program accessible from any computer-readable device or storage media. In one implementation, method 600 may be performed by a kernel of a hypervisor as shown in FIG. 1 or by an executable code of a host machine (e.g., host operating system or firmware), a virtual machine (e.g., guest operating system or virtual firmware), other executable code, or a combination thereof.

Method 600 may be performed by processing devices of a server device or a client device and may begin at block 610.

At block 610, the processing device receives an ephemeral key. At block 620, responsive to initiation of an access request by a host of the computing system encrypted using the ephemeral key and directed to a peripheral device accessible via the bridge device, the processing device decrypts, by the bridge device, the access request using the ephemeral key.

At block 630, the processing device forwards the access request to the peripheral device. Prior to forwarding the decrypted access request to the peripheral device, the processing device determines whether the current state measurement matches the state measurement validated by the host. In some embodiments, the processing device identifies a current state measurement associated with the bridge device to compare the current state measurement and a state measurement validated by the host. Then processing device determines whether the current state measurement matches the state measurement validated by the host.

Depending on the embodiment, responsive to determining that current state measurement does not match the state measurement validated by the host, the processing device transmits a reset command to the peripheral device and/or transmits an interrupt command to the host.

At block 640, the processing device receives, by the bridge device, a response associated with the access request. At block 650, the processing device encrypts, by the bridge device, the response using the ephemeral key. At block 660, the processing device forwards the response to the host.

Figure 7:
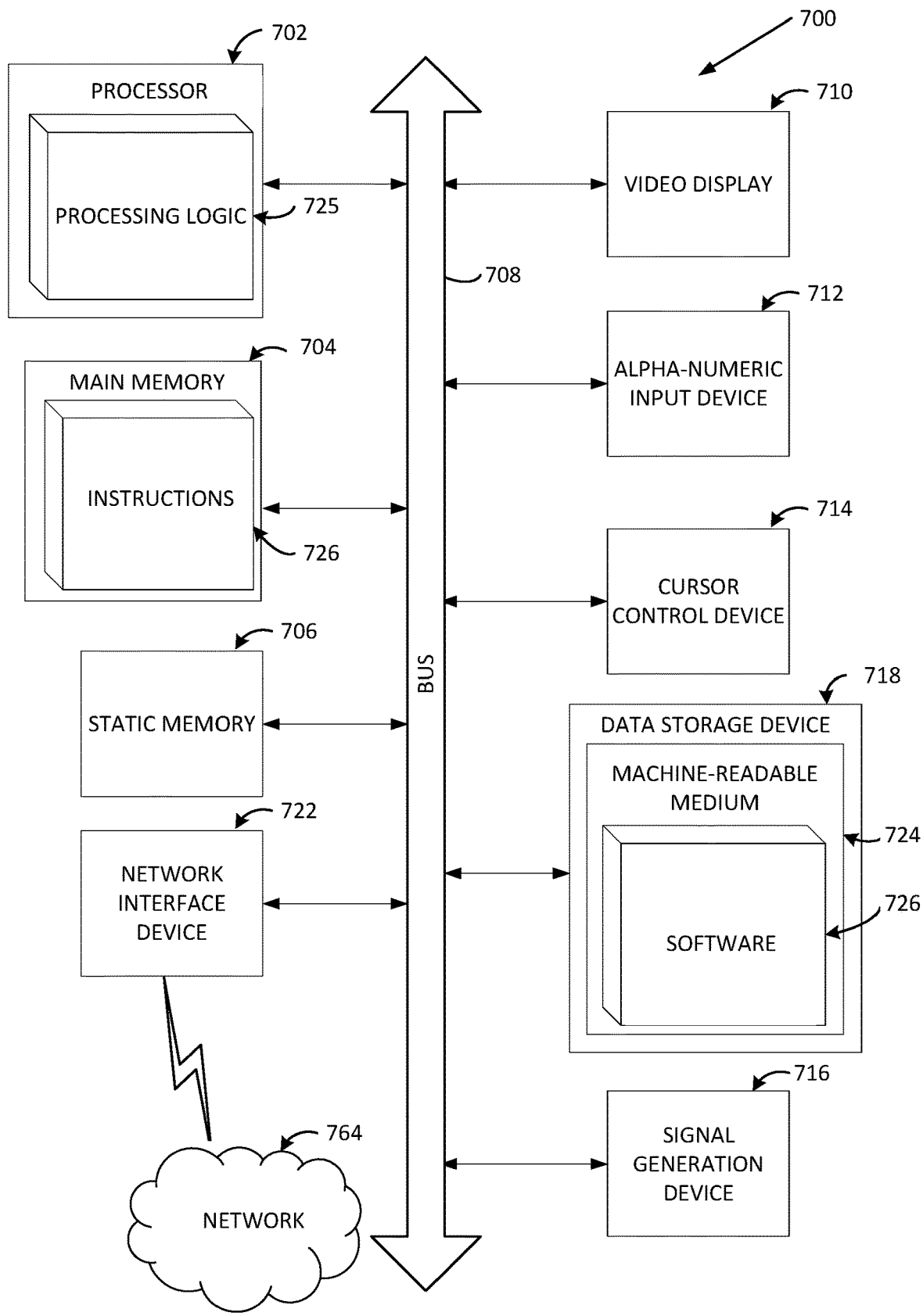
FIG. 7 is a block diagram illustrating a computing system in which implementations of the disclosure may be used.

FIG. 7 is a block diagram illustrating a computer system in which implementations of the disclosure may be used. In some implementations, the computer system 700 may support secured peripheral device communication via a bridge device in virtualized computer systems, in accordance with previously described embodiments.

Computer system 700 may be included within a data center that supports virtualization. Virtualization within a data center results in a physical system being virtualized using VMs to consolidate the data center infrastructure and increase operational efficiencies. A VM may be a program-based emulation of computer hardware of the virtualized data center. For example, VM may operate based on computer architecture and functions of computer hardware resources associated with hard disks or other such memory. VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for supporting manifest list for multi-platform application container images.

Computer system 700 includes a processing device 702, a main memory 704 (e.g., read-only memory (ROM), flash memory, dynamic random access memory (DRAM) (such as synchronous DRAM (SDRAM) or DRAM (RDRAM), etc.), a static memory 706 (e.g., flash memory, static random access memory (SRAM), etc.), and a data storage device 716, which communicate with each other via a bus 708.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is to execute the instructions 726 for performing the operations and steps discussed herein.

Computer system 700 may further include a network interface device 722 communicably coupled to a network 725. Computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

Instructions 726 may reside, completely or partially, within volatile memory 704 and/or within processing device 702 during execution thereof by computer system 700, hence, volatile memory 704 and processing device 702 may also constitute machine-readable storage medium 724. Instructions 726 may also implement VM 144, peripheral device 122, bridge device 190 to support secure communication between VM 144 and peripheral device 122.

Data storage device 716 may include a computer-readable storage medium 724 (e.g., a non-transitory computer-readable storage medium) on which may store instructions 726 encoding any one or more of the methods or functions described herein, including instructions for implementing method 500 of FIG. 5 and method 600 of FIG. 6.

Non-transitory machine-readable storage medium 724 may also be used to store instructions 726 to support caching results of certain commands utilized for building multi-platform application container images described herein, and/or a software library containing methods that call the above applications. While the machine-accessible storage medium 724 is shown in an example implementation to be a single medium, the term "machine-accessible storage medium" should be taken to include a single medium or multiple media (e.g., a centralized or distributed database, and/or associated caches and servers) that store the one or more sets of instructions. Term "machine-accessible storage medium" shall also be taken to include any medium that is capable of storing, encoding or carrying a set of instruction for execution by the machine and that cause the machine to perform any one or more of the methodologies of the disclosure. Term "machine-accessible storage medium" shall accordingly be taken to include solid-state memories, and optical and magnetic media.

Unless specifically stated otherwise, terms such as "receiving," "invoking," "associating," "providing," "storing," "performing," "utilizing," "deleting," "initiating," "marking," "generating," "transmitting," "completing," "executing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third,"

"fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

Methods and illustrative examples described herein are not inherently related to any particular computer or other apparatus. Various general purpose systems may be used in accordance with the teachings described herein, or it may prove convenient to construct more specialized apparatus to perform methods 500 and 600 and/or each of its individual functions, routines, subroutines, or operations. Examples of the structure for a variety of these systems are set forth in the description above.

Above description is intended to be illustrative, and not restrictive. Although the disclosure has been described with references to specific illustrative examples and implementations, it should be recognized that the disclosure is the examples and implementations described. Scope of the disclosure should be determined with reference to the following claims, along with the full scope of equivalents to which the claims are entitled.

Other computer system designs and configurations may also be suitable to implement the system and methods described herein. The following examples illustrate various implementations in accordance with one or more aspects of the present disclosure.

Example 1 includes a method comprising: receiving, by a virtualized execution environment running on a computing system, a state measurement associated with a bridge device of the computing system; generating an ephemeral key; responsive to validating the state measurement, transmitting, to the bridge device, the ephemeral key encrypted using a device key associated with the bridge device; and transmitting, to the bridge device, an access request directed to a peripheral device accessible via the bridge device encrypted using a value derived from the ephemeral key.

Example 2 includes subject matter of example 1, wherein virtualized execution environment is represented by one of: a virtual machine or a container.

Example 3 includes subject matter of example 1, wherein the bridge device is a Peripheral Component Interconnect (PCI)-to-PCI bridge.

Example 4 includes subject matter of example 1, wherein the peripheral device is one of: a Peripheral Component Interconnect express (PCIe) device, a virtual function of the PCIe device, or a sub-function of the PCIe device.

Example 5 includes subject matter of example 1, where the bridge device is one of: a physical bridge device or a virtual bridge device.

Example 6 includes subject matter of example 1, wherein generating the ephemeral key comprises applying a predetermined transformation on an ephemeral value and the device key.

Example 7 includes subject matter of example 1, wherein validating the state measurement comprises: comparing the state measurement of the bridge device with an expected state measurement of the bridge device.

Example 8 includes subject matter of example 1, wherein transmitting the ephemeral key includes encrypting the ephemeral key and the validated state measurement using the device key associated with the bridge device.

Example 9 includes subject matter of example 1, wherein the access request is initiated by an application of the virtualized execution environment running on the computing system.

Example 10 includes subject matter of example 1, further comprising: receiving an indication, in response to determining that a configuration space of the bridge was not altered, that the access request was decrypted using the value and forwarded to the peripheral device accessible via the bridge device.

Example 11 includes subject matter of example 1, further comprising receiving an interrupt indicating that a configuration space of the bridge device has been altered and responsive to receiving the interrupt by the virtualized execution environment, suspending the virtualized execution environment.

Example 12 includes a bridge device of a computing system, the bridge device comprising: a memory; and a processing device operatively coupled to the memory, the processing device to receive an ephemeral key; responsive to initiation of an access request by a host of the computing system encrypted using the ephemeral key and directed to a peripheral device accessible via the bridge device, decrypt, by the bridge device, the access request using the ephemeral key; forward the access request to the peripheral device; receive, by the bridge device, a response associated with the access request; encrypt, by the bridge device, the response using the ephemeral key; and forward the response to the host.

Example 13 includes subject matter of example 12, wherein the processing device is further to: monitor a configuration space of the bridge device.

Example 14 includes subject matter of example 13, wherein forwarding the decrypted access request to the peripheral device is performed responsive to determining that current state measurement matches the state measurement validated by the host.

Example 15 includes subject matter of example 13, wherein the processing device is further to: responsive to determining that current state measurement does not match the state measurement validated by the virtualized execution environment, transmit a reset command to the peripheral device.

Example 16 includes subject matter of example 13, wherein the processing device is further to: responsive to determining that current state measurement does not match the state measurement validated by the virtualized execution environment, transmit an interrupt command to the virtualized execution environment.

Example 17 includes a non-transitory computer readable storage medium including instructions that, when executed by a processing device, cause the processing device to perform a method comprising: receiving, by a virtualized execution environment running on a computing system, a state measurement associated with a bridge device of the computing system; generating an ephemeral key; responsive to validating the state measurement, transmitting, to the bridge device, the ephemeral key encrypted using a device key associated with the bridge device; and transmitting, to the bridge device, an access request directed to a peripheral device accessible via the bridge device encrypted using a value derived from the ephemeral key.

Example 18 includes subject matter of example 17, wherein the virtualized execution environment is represented by one of: a virtual machine or a container.

Example 19 includes subject matter of example 17, wherein the bridge device is a Peripheral Component Interconnect (PCI)-to-PCI bridge.

Example 20 includes subject matter of example 17, wherein the peripheral device is one of: a Peripheral Component Interconnect express (PCIe) device, a virtual function of the PCIe device, or a sub-function of the PCIe device.

Example 21 includes subject matter of example 17, wherein generating the ephemeral key comprises applying a predetermined transformation on an ephemeral value and the device key.

Example 22 includes the subject matter of example 17, wherein validating the state measurement comprises: comparing the state measurement of the bridge device with an expected state measurement of the bridge device.

Example 23 includes the subject matter of example 17, wherein transmitting the ephemeral key includes encrypting the ephemeral key and the validated state measurement using the device key associated with the bridge device.

Example 24 includes the subject matter of example 17, wherein the access request is initiated by an application of the virtualized execution environment running on the computing system.

Example 25 includes the subject matter of example 17, further comprising: receiving an indication, in response to determining that a configuration space of the bridge was not altered, that the access request was decrypted using the value and forwarded to the peripheral device accessible via the bridge device.

Example 26 includes the subject matter of example 17, further comprising: receiving an interrupt indicating that a configuration space of the bridge device has been altered and responsive to receiving the interrupt by the virtualized execution environment, suspending the virtualized execution environment.

Example 27 includes a method comprising: responsive to receiving, by a bridge device, an ephemeral key and a validated state measurement associated with the bridge device, monitoring a current state measurement of the bridge device; and determining, based on the monitoring, whether to proceed with an access request.

Example 28 include subject matter of example 27, wherein the ephemeral key and the validated state measurement is received from a virtualized execution environment.

Example 29 include subject matter of example 27, wherein the ephemeral key and the validated state measurement is encrypted with a device key of the bridge device.

Example 30 include subject matter of example 27, wherein monitoring includes identify a current state measurement associated with the bridge device and comparing the current state measurement with the validated state measurement to identify alterations in a configuration space of the bridge device.

Example 31 include subject matter of example 27, wherein determining not to proceed with the access request based on the monitoring indicating a change to the configuration space of the bridge device.

Example 32 include subject matter of example 31, wherein not proceeding with the access request includes responsive to receiving the access request encrypted by the virtual machine directed to the peripheral device or the access request from the peripheral device directed to the virtual machine device to be encrypted, transmitting at least one of: a reset command to the peripheral device or a interrupt command to the virtual machine.

Example 33 include subject matter of example 32, wherein determining to proceed with the access request based on the monitoring indicating no change to the configuration space of the bridge device.

Example 34 include subject matter of example 33, wherein proceeding with the access request includes responsive to receiving the access request encrypted by the virtual machine directed to the peripheral device or the access request from the peripheral device directed to the virtual machine device to be encrypted, forwarding the access request.

Example 35 is a system comprising: a memory; and a processing device operatively coupled to the memory, the processing device to implement the subject matter of any of examples 1-34.

Example 36 is a non-transitory machine-readable storage medium including instructions that, when accessed by a processing device, cause the processing device to implement the subject matter of any of examples 1-34.

Example 37 is a method to implement the subject matter of any of examples 1-34.

What is claimed is:

1. A method comprising:
    receiving, by a virtualized execution environment running on a computing system, a state measurement associated with a bridge device of the computing system;
    generating an ephemeral key;
    responsive to validating the state measurement, transmitting, to the bridge device, the ephemeral key encrypted using a device key associated with the bridge device;
    transmitting, to the bridge device, an access request directed to a peripheral device accessible via the bridge device, wherein the access request is encrypted using a value derived from the ephemeral key; and
    responsive to receiving an interrupt from the bridge device, suspending the virtualized execution environment.

2. The method of claim 1, wherein the virtualized execution environment is represented by one of: a virtual machine or a container.

3. The method of claim 1, wherein the bridge device is a Peripheral Component Interconnect (PCI)-to-PCI bridge.

4. The method of claim 1, wherein the peripheral device is one of: a Peripheral Component Interconnect express (PCIe) device, a virtual function of the PCIe device, or a sub-function of the PCIe device.

5. The method of claim 1, where the bridge device is one of: a physical bridge device or a virtual bridge device.

6. The method of claim 1, wherein generating the ephemeral key comprises applying a predetermined transformation on an ephemeral value and the device key.

7. The method of claim 1, wherein validating the state measurement comprises:
    comparing the state measurement of the bridge device with an expected state measurement of the bridge device.

8. The method of claim 1, wherein transmitting the ephemeral key includes encrypting the ephemeral key.

9. The method of claim 8, further comprising:
    transmitting the validated state measurement using the device key associated with the bridge device.

10. The method of claim 1, wherein the access request is initiated by an application of the virtualized execution environment running on the computing system.

11. The method of claim 1,
wherein the interrupt indicates that a configuration space of the bridge device has been altered.

12. A bridge device of a computing system, the bridge device comprising:
a memory; and
a controller operatively coupled to the memory, the controller to:
  receive an ephemeral key;
  responsive to receiving, from a processor of the computing system, an encrypted access request directed to a peripheral device accessible via the bridge device, decrypt, the access request using the ephemeral key;
  forward the decrypted access request to the peripheral device;
  receive, from the peripheral device, a response to the access request;
  encrypt the response using the ephemeral key;
  forward the response to the processor; and
  responsive to an alteration of a configuration space of the bridge device, transmit an interrupt command to the processor.

13. The bridge device of claim 12, wherein the controller is to:
  obtain a current state measurement associated with the bridge device;
  compare the current state measurement and a state measurement validated by the processor; and
  determine whether the current state measurement matches the state measurement validated by the processor.

14. The bridge device of claim 13, wherein the controller is to forward the decrypted access request to the peripheral device responsive to determining that current state measurement matches the state measurement validated by the processor.

15. The bridge device of claim 13, wherein the controller is further to:
  responsive to determining that current state measurement does not match the state measurement validated by the processor, transmit a reset command to the peripheral device.

16. The bridge device of claim 13, wherein the controller is further to:
  responsive to determining that current state measurement does not match the state measurement validated by the processor, transmit the interrupt command to the processor.

17. A non-transitory computer readable storage medium including instructions that, when executed by a processing device, cause the processing device to:
  receive, by a virtualized execution environment running on a computing system, a state measurement associated with a bridge device of the computing system;
  generate an ephemeral key;
  responsive to validating the state measurement, transmit, to the bridge device, the ephemeral key encrypted using a device key associated with the bridge device;
  transmit, to the bridge device, an access request directed to a peripheral device accessible via the bridge device, wherein the access request is encrypted using a value derived from the ephemeral key; and
  responsive to receiving an interrupt from the bridge device, suspend the virtualized execution environment.

18. The non-transitory computer readable storage medium of claim 17, wherein the virtualized execution environment is represented by one of: a virtual machine or a container.

19. The non-transitory computer readable storage medium of claim 17, wherein the bridge device is a Peripheral Component Interconnect (PCI)-to-PCI bridge.

20. The non-transitory computer readable storage medium of claim 17, wherein the peripheral device is one of: a Peripheral Component Interconnect express (PCIe) device, a virtual function of the PCIe device, or a sub-function of the PCIe device.

* * * * *